US011807343B2

(12) United States Patent
Bartminn et al.

(10) Patent No.: US 11,807,343 B2
(45) Date of Patent: Nov. 7, 2023

(54) BUOYANT FOUNDATION STRUCTURE FOR AN OFFSHORE CONSTRUCTION

(71) Applicants: Daniel Bartminn, Elmshorn (DE); Henrik Stiesdal, Odense (DK)

(72) Inventors: Daniel Bartminn, Elmshorn (DE); Henrik Stiesdal, Odense (DK)

(73) Assignees: RWE Renewables GmbH, Essen (DE); Stiesdal Offshore Technologies A/S, Odense C (DK)

( * ) Notice: Subject to any disclaimer, the term of this patent is extended or adjusted under 35 U.S.C. 154(b) by 0 days.

(21) Appl. No.: 17/951,863

(22) Filed: Sep. 23, 2022

(65) Prior Publication Data

US 2023/0047054 A1 Feb. 16, 2023

Related U.S. Application Data

(63) Continuation of application No. PCT/EP2021/054512, filed on Feb. 24, 2021.

(30) Foreign Application Priority Data

Mar. 24, 2020 (DE) .................... 10 2020 108 030.1

(51) Int. Cl.
*B63B 35/44* (2006.01)
*B63B 75/00* (2020.01)

(52) U.S. Cl.
CPC .............. *B63B 35/44* (2013.01); *B63B 75/00* (2020.01); *B63B 2035/446* (2013.01)

(58) Field of Classification Search
CPC ... B63B 35/44; B63B 75/00; B63B 2035/446; B63B 21/04; Y02E 10/727; Y02E 10/72
USPC ............................................ 114/266, 230.26
See application file for complete search history.

(56) References Cited

U.S. PATENT DOCUMENTS

| 5,803,439 | A | * | 9/1998 | Gilmore | .................... F16F 1/12 267/74 |
| 9,550,549 | B1 | * | 1/2017 | Ratigan | .................... B63B 21/20 |
| 9,796,459 | B2 | * | 10/2017 | Huang | .................... B63B 35/44 |
| 2003/0168864 | A1 | | 9/2003 | Heronemus et al. | |

FOREIGN PATENT DOCUMENTS

| EP | 3199803 B1 | | 8/2017 |
| GB | 2378679 A | | 2/2003 |
| KR | 2296855 B1 | * | 9/2021 |
| WO | WO 2007/014670 A1 | | 2/2007 |
| WO | WO 2012/030123 A2 | | 3/2012 |
| WO | WO 2012/151388 A1 | | 11/2012 |
| WO | WO 2014/140653 A1 | | 9/2014 |

* cited by examiner

*Primary Examiner* — Anthony D Wiest
(74) *Attorney, Agent, or Firm* — Reinhart Boerner Van Deuren P.C.

(57) ABSTRACT

The application relates to a floatable foundation structure for an offshore structure including at least one floating body arrangement and at least one mass arrangement. The mass arrangement is connected to the floating body arrangement by at least one holding rope in a coupling state. Further, in the coupling state for coupling the floating body arrangement to the mass arrangement, a coupling section of the holding rope is arcuately guided around a contact section of the mass arrangement.

22 Claims, 8 Drawing Sheets

BUOYANT FOUNDATION STRUCTURE FOR AN OFFSHORE CONSTRUCTION

CROSS-REFERENCE TO RELATED PATENT APPLICATIONS

This patent application is a continuation of International Application No. PCT/EP2021/054512, filed on Feb. 24, 2021, which claims the benefit of priority to German Patent Application No. 10 2020 108 030.1, filed Mar. 24, 2020, the entire teachings and disclosures of both applications are incorporated herein by reference thereto.

FIELD

The application relates to a floatable foundation structure for an offshore structure, comprising at least one floating body arrangement and at least one mass arrangement, wherein the mass arrangement is couplable to the floating body arrangement by at least one holding rope in a coupling state. Furthermore, the application relates to an offshore structure and a method for manufacturing a floatable foundation structure.

BACKGROUND

Wind farms with at least one wind turbine are increasingly used to provide electrical energy from so-called renewable energy sources. In particular, a wind turbine is configured to convert the kinetic wind energy into electrical energy.

In order to increase the energy yield in such systems, wind farms are arranged and installed, respectively, at locations with a high wind probability. In particular, offshore locations are usually characterized by relatively continuous wind conditions and high average wind speeds, so that so-called offshore wind farms are increasingly being erected.

Usually, an offshore wind farm comprises a plurality of offshore wind energy devices, such as a plurality of offshore wind turbines, measuring masts and/or at least one offshore substation, via which the offshore wind farm is electrically connected, for example, to an onshore substation or a further offshore substation and offshore converter station, respectively. An onshore substation, in turn, may be connected to a public power grid.

In order to transmit electrical power between two offshore wind energy devices or an offshore wind energy device and an onshore device, power cables are laid in the form of submarine cables.

While it has been common practice for offshore wind farms to anchor an offshore wind energy device (in particular, a tower of an offshore wind energy device) by a foundation structure (e.g. monopile, tripod, tripile or jacket foundations) directly in the water bottom, in particular a seabed, there have recently been increasing considerations to install floating offshore wind energy devices, for example floating offshore wind turbines, in order to install offshore wind farms in a simpler and cost-reduced manner, for example in areas with a large water depth, for example of more than 50 m, in particular more than 80 m.

Such floating offshore structures, such as a floating offshore wind turbine, typically have at least one floating body arrangement and at least one mass arrangement. For example, in the prior art, a mass arrangement may be coupled to the floating body arrangement in a coupling state by, in particular, a plurality of holding ropes. In particular, the mass arrangement may be suspended from/at the floating body arrangement by at least one holding rope. Thereby, the mass arrangement attached to the floating body arrangement by at least one holding rope may be suspended above the seabed or optionally in contact with the seabed and/or anchored in the seabed.

In this regard, it is known from the prior art to fix one end of the holding rope to the floating body arrangement and the other end of the holding rope to the mass arrangement. For this purpose, for example, eyelets are welded to the respective attachment points of the floating body arrangement and the mass arrangement. The two ends of the holding rope may be fixed to the eyelets by clamps, splices, etc. For example, a connection can be made by means of fork head and anchor plate.

The disadvantage of this is that the manufacturing of such a rope fixation is complex (in particular, a high degree of welding is required) and involves corresponding costs. Furthermore, the manufacture of the rope ends, e.g. by swaging, is time-consuming and cost-intensive. In addition, an inspection of the rope attachments to the mass arrangement is very time-consuming, since the mass arrangement is regularly positioned at a water depth of far more than 50 meters.

BRIEF SUMMARY

Therefore, the object of the present application is to provide a floatable foundation structure of an offshore structure, which can be manufactured and maintained and/or inspected with a lower effort and, in particular, low costs.

The object is solved according to a first aspect of the application by a floatable foundation structure for an offshore structure according to claim 1. The floatable foundation structure comprises at least one floating body arrangement. The floatable foundation structure comprises at least one mass arrangement. The mass arrangement is couplable (in particular, coupled) to the floating body arrangement by at least one holding rope in a coupling state. In the coupling state, for coupling the floating body arrangement to the mass arrangement, a coupling section of the holding rope is arcuately guided around a contact section of the mass arrangement.

In contrast to the prior art, since, in the floatable foundation structure according to the application, one end of the holding rope is not directly fixed to the mass arrangement, but the holding rope is looped arcuately around a contact section of the mass arrangement, a floatable foundation structure is provided which can be manufactured and maintained with less effort and, in particular, lower costs. In particular, the overall number of attachment points and/or the number of attachment points at the mass arrangement can be reduced. The attachment of eyelets or the like at the mass arrangement can be eliminated altogether. The welding work required can be reduced.

In particular, the floatable foundation structure serves to support an offshore structure (stationary in the installation state of the offshore structure). Exemplary and non-exhaustive offshore structures are, in particular, wind farm structures, such as offshore wind turbines, offshore measuring stations, offshore substations, but also other offshore structures, such as drilling platforms or the like.

The floatable (and floating, respectively) foundation structure according to the application comprises at least one floating body arrangement. A floating body arrangement may be formed of one or more floating bodies coupled to each other. In this context, a floating body and buoyant body, respectively, means, in particular, an object that is independently buoyant due to its buoyancy by displacement according to Archimedes' principle. A buoyant body may, for example, be at least partially hollow in its interior and/or filled with a light solid material.

It shall be understood that a floating body arrangement may comprise further elements, such as at least one connecting element (e.g., a strut) that connects two floating bodies to each other or serves to connect them to a part of the offshore structure, or the like.

Furthermore, the floatable foundation structure according to the application comprises at least one mass arrangement. In particular, a mass arrangement is a weight arrangement and ballast arrangement, respectively. A mass arrangement may be formed by one mass body or multiple interconnected mass bodies and weight bodies, respectively, (also called ballast body).

It shall be understood that a mass arrangement may comprise further elements, such as at least one connecting element (e.g. a strut), which, for example, connects two mass bodies to each other. In this regard, the mass arrangement may be independently floatable, at least temporarily. For example, the mass arrangement may be temporarily (e.g., for the transport) at least partially filled with a gas. The gas can be let out (and let in) via at least one valve, in particular at the installation site. This greatly simplifies the transportation of a mass arrangement as well as the installation.

Further, the floatable foundation structure comprises at least one holding rope. Preferably, two or more holding ropes may be provided. A holding rope is configured to (permanently) couple the mass arrangement to the floating body arrangement. When the mass arrangement is coupled to the floating body arrangement by the at least one holding rope, the foundation structure is in a coupling state. In the coupling state and an installed state of the foundation structure, the mass arrangement and the floating body arrangement are positioned in a defined manner with respect to each other, in particular have a specific distance from each other. Here, a defined position is also present when the mass arrangement and the floating body arrangement move relative to each other (for example, when the mass arrangement is suspended from the floating body arrangement).

According to the application, it is provided that in the coupling state the holding rope is guided, at least starting from the floating body arrangement to the mass arrangement, around a contact section of the mass arrangement and back to the floating body arrangement. For example, a first end of the holding rope may be (directly) fixed to the floating body arrangement and a second end of the holding rope may be (directly) fixed to the floating body arrangement. The holding rope may be guided from the first attachment point to the mass arrangement (in a first vertical direction) and guided back from the mass arrangement (in an opposite vertical direction), in particular to the second attachment point. Here, a coupling section of the holding rope is guided in an arcuate form (for example, substantially v-shaped or u-shaped) around a contact section of the mass arrangement. In other words, the contact section of the mass arrangement is at least partially wrapped.

In particular, it has been recognized according to the application that for a stable holding of the mass arrangement and in particular—in an installation state—for a permanent coupling of the mass arrangement with the floating body arrangement, it is not necessary that one end of the holding rope is directly connected to the mass arrangement via an eyelet or the like, but that for this purpose a looping around a part of the mass arrangement, namely the contact section, is sufficient due to the weight force acting on the mass arrangement. Thus, a mass arrangement may have a weight of several tons (e.g., >1000 tons). By having a section of the mass arrangement looped by the holding rope, the holding rope is tensioned between the mass arrangement and the floating body arrangement by the weight force acting thereon. Thereby a permanent coupling and in particular a defined position between the mass arrangement and the floating body arrangement is achieved.

In the present case, a coupling between the mass arrangement and the floating body arrangement is achieved by a holding rope being looped only around a part of the mass arrangement (i.e. the contact section) without providing a (direct) connection of one end of the holding rope to the mass arrangement.

The coupling section of the holding rope is in particular an intermediate section (located at least between the end sections of the holding rope) of the holding rope which contacts the contact section of the mass arrangement in the coupling state. The contact section of the mass arrangement may be formed by one or more element(s) (e.g., mass body and/or connecting element) of the mass arrangement, which contact(s) the coupling section of the holding rope at least partially in the coupling state.

In principle, the at least one holding rope may be formed of any material. Preferably, the holding rope and tether cable, respectively, can be made of metal (e.g., steel), polyethylene (preferably HDPE (high-density polyethylene)) or a synthetic fiber material. Such materials are particularly suitable for use in water (in particular salt water) and have high tensile strength.

In addition, the mass arrangement may preferably be a mass stabilizer arrangement suspended at/from the floating body arrangement (in particular in the form of a so-called keel). The mass stabilizer arrangement may be configured to stabilize the foundation structure (and offshore structure, respectively) in an installed state of the foundation structure (and offshore structure, respectively). For this purpose, the mass stabilizer arrangement may be suspended in the form of a pendulum by the at least one holding rope.

In a preferred embodiment, the floating body arrangement may be formed by a plurality of connecting elements in the form of tubes (in particular steel tubes) and/or struts (in particular steel struts) to which a plurality (e.g. (at least) three, preferably seven) floating bodies may be attached. For example, three floating bodies may form a triangular shape in a horizontal plane in an installation state (each leg of the triangle may be formed by one floating body). Additional floating bodies may be arranged inside the triangle.

In particular, the floating body arrangement may be coupled to the mass stabilizer arrangement by a plurality of holding ropes. The mass stabilizer arrangement may comprise a plurality of tubular mass bodies, preferably forming a triangular shape in a horizontal plane in an installation state. By being suspended from the floating body arrangement in a coupling state, the mass stabilizer arrangement acts as a pendulum that sufficiently (permanently) stabilizes the foundation structure in the installed state.

In principle, the mass arrangement may be formed of any material. Preferably, the mass arrangement (in particular the at least one mass body) can be made of steel, cast iron, cast steel, concrete, a cementitious material or a combination thereof. Such materials are particularly suitable for use in water as a weight module.

According to a preferred embodiment of the floatable foundation structure according to the application, in the coupling state, the coupling section of the holding rope may be arcuately guided around the contact section of the mass arrangement such that the coupling section of the holding rope forms a loop retainer in which the contact section of the mass arrangement is held/retained. In particular, the loop retainer may be formed by at least half a turn. It shall be understood that the holding rope may also be and may extend, respectively, at least once completely (for example, at least about 1.5 turns) around the contact section of the mass arrangement. A secure coupling can be established in a simple manner.

According to a further embodiment of the floatable foundation structure, in the coupling state the coupling section of the holding rope may be formed by at least two leg subsections and at least one bend subsection, wherein the two leg subsections may be connected to each other by the bend subsection. The angle between the leg subsections may be at least smaller than 135°, preferably at least smaller than 90°, more preferably at least smaller than 15°. At least at an angle smaller than 135°, a secure coupling can be established. In particular, in this case an almost U-shaped loop retainer can be formed in which the mass arrangement can be held securely (due to the acting weight force). A particularly preferred coupling is achieved when the angle is at least less than 15° (i.e. between 0° and 15°).

Furthermore, it has been recognized that the mechanical stress and thus the load on a holding rope depends, among other things, on the bending radius of the (bent) coupling section in the coupling state. According to a further preferred embodiment of the floatable foundation structure, it is therefore proposed that the bending radius of the holding rope, in particular in the region of the contact section (to be looped) of the mass arrangement, is at least two times larger than the diameter of the holding rope, preferably at least five times larger, in particular preferably at least ten times larger (and at the highest a thousand times larger). Particularly advantageous are bending radii greater than fifteen times, in particular twenty times, the holding rope diameter. Also, in an embodiment, the holding rope may be wound several times around the mass arrangement and a contact section, respectively of the mass arrangement.

As has already been described, a holding rope may preferably be (directly) attached to the floating body arrangement by the two rope ends. According to an embodiment of the floatable foundation structure, the (both) ends of the holding rope may be fixed/attached to the floating body arrangement at one attachment point each, wherein in a coupling state, an attachment point is higher in the vertical direction than the contact section of the mass arrangement. Preferably, since both ends of a holding rope are directly fixed to the floating body arrangement at a common or two different attachment point(s), both attachment points of a holding rope are closer to the water surface than this is the case in the prior art (when an attachment point of one end of a holding rope is attached to the mass arrangement). The inspection and/or maintenance of attachment points can be significantly simplified. Since the tensile forces are divided between the two sections of the holding rope, smaller holding rope diameters can also be selected, which in turn has a positive effect on the cost of the holding rope and the rope end devices.

According to a further embodiment of the floatable foundation structure according to the application, in the coupling state the mass arrangement may be suspended from the floating body arrangement by the at least one holding rope in a (permanent, i.e. substantially constant) coupling position (also called installation position). As has been described, a suspended mass arrangement may in particular be arranged to stabilize the position of the offshore structure during operation. The distance between the coupling position and the bottom of the water may preferably be at least 15 m, in particular preferably at least 50 m. The upper limit of the distance depends in particular on the water depth at the installation location of the foundation structure and is basically limited by it.

In a further embodiment of the floatable foundation structure, the mass arrangement (e.g. in the form of an anchor or similar device) may be in contact with the water bottom in the coupling state.

According to a particularly preferred embodiment of the floatable foundation structure according to the application, at least one motion reduction element may be arranged at the coupling section of the holding rope and/or at the contact section of the mass arrangement, wherein the motion reduction element is configured at least to reduce a relative movement between the coupling section of the holding rope and the contact section of the mass arrangement in the coupling state. By at least reducing the relative movement in the contact section between the holding rope and the mass arrangement by an arrangement of one or more motion reduction elements, friction-based wear can be reduced. The service life of the structure can be increased.

An additional advantage of a motion reduction element is that the connection between the holding rope and the mass arrangement can be maintained in an even more secure manner in the installation state of the foundation structure. In particular, slippage of the holding rope from the mass arrangement can be prevented in an even safer manner (even in the presence of strong water currents).

The at least one motion reduction element may be arranged at the coupling section of the holding rope and/or the contact section of the mass arrangement, such as at a contact surface of the coupling section of the holding rope and/or at a contact surface of the contact section of the mass arrangement. A contact surface of an element (e.g., holding rope) is in particular the surface which, in the coupling state, at least temporarily and potentially contacts a further contact surface of the further element (e.g., mass arrangement).

Preferably, the at least one motion reduction element may be selected from the group comprising:
  clamp element,
  friction element configured to increase friction in a contact region between the coupling section of the holding rope and the contact section of the mass arrangement, i.e., in particular configured to increase friction in said contact region,
  adhesive agent, and
  potting agent (or grouting means).

For example, one or more clamp elements may be attached to the coupling section of the holding rope and/or the contact section of the mass arrangement to at least limit the relative movement. Also, a potting agent may be applied in a coupling state. It is also conceivable that at least one contact surface is provided with a friction element that increases the coefficient of friction between the holding rope and the mass arrangement (e.g., at least greater than 0.5). It is also conceivable to apply an adhesive to at least one contact surface between the holding rope and the mass arrangement. It shall be understood that different motion reduction elements may be combined.

According to a further preferred embodiment, at least one friction reduction element may be arranged (at least in the coupling state) at the coupling section of the holding rope and/or the contact section of the mass arrangement, wherein the friction reduction element is configured at least to reduce the coefficient of friction in a contact area between the coupling section of the holding rope and the contact section of the mass arrangement to at least less than 0.15, in particular less than 0.05. By reducing the coefficient of friction, in particular between the respective contact surfaces of the coupling section and contact section, respectively, friction-based wear can be reduced.

Preferably, the at least one friction reduction element may be at least one greasy and/or oiled contact surface of the coupling section of the holding rope and/or the contact section of the mass arrangement. Alternatively or additionally, the at least one friction reduction element may be a soft surface layer of the coupling section of the holding rope and/or the contact section of the mass arrangement, wherein the soft surface layer may in particular be made of an elastomeric material.

Exemplary but non-exhaustive elastomeric materials include neoprene rubber, thermoplastic elastomeric materials, or polymeric materials, which in particular allow for expansion of the holding rope or contact section surface by shear deformation of the material, while there is in particular virtually no relative movement between the coupling section of the holding rope and the contact section of the mass arrangement. Particularly preferably, both the contact surface of the coupling section of the holding rope may have a soft layer (e.g., the entire outer rope surface of the coupling section) and the contact surface of the contact section of the mass arrangement may have a soft layer.

Further, a friction reduction element (e.g., soft layer) may be used in combination with a motion reduction element (e.g., clamp element).

Furthermore, according to a further embodiment of a floatable foundation structure, the contact section of the mass arrangement may comprise a recess, wherein the inner shape of the recess may correspond in particular to the outer shape of the coupling section of the holding rope. In particular, the recess may be formed in the shape of a groove corresponding to the outer shape of the coupling section of the holding rope. The diameter of the groove may be equal to or slightly larger than the diameter of the coupling section of the holding rope. The risk of lateral slippage can be further reduced.

According to a particularly preferred embodiment of the floating foundation structure according to the application, the contact section of the mass arrangement may be formed by a turning pin (or the like) attached to the mass arrangement. A turning pin is configured to shape the orientation of the holding rope independent of the geometry and orientation of the mass arrangement. In other words, a turning pin has a deflection and alignment function and in particular represents a particularly preferred embodiment which can also be designed as a motion reduction element. A (e.g. cylindrical) turning pin can, for example, protrude from an outer wall of the mass arrangement and have an (at least partially) circumferential collar at its end. In this case, the contact section of the holding rope may arcuately run between the outer wall of the mass arrangement and the circumferential collar.

A mass arrangement may have a plurality of turning pins. In particular, a turning pin may be provided on an outer side of the mass arrangement, preferably in a pre-described corner region of the mass arrangement.

Preferably, the contact section (e.g. in the form of a turning pin or similar element) is frictionally connected (e.g. welded, screwed, glued, cast) to the mass arrangement. This embodiment allows the holding rope to be coupled to the mass arrangement in a particularly secure manner.

High forces act on a holding rope and cable, respectively, in an installation state and in particular in an operative state of the foundation structure, which can be increased by, among other things, a (temporary) current present at the installation site, in particular also by waves. In order to at least reduce the risk of a damage of a holding rope (e.g. a tearing of the holding rope), according to a further preferred embodiment, it is proposed that a spring-loaded suspension mechanism (for attaching the holding rope to the floating structure) is arranged at at least one end of the holding rope (preferably at both ends of the holding rope). In particular, the spring-loaded suspension mechanism may be configured to reduce the peak dynamic forces in the holding rope by at least 5%, preferably at least 15%, compared to a non-spring-loaded attachment of the holding rope.

Further, according to a further embodiment of the floatable foundation structure, at least one mechanical vibration absorber may be arranged at the holding rope, in particular a Stockbridge vibration absorber. A mechanical vibration absorber may in particular reduce vibrations caused, for example, by a water current and/or components of the offshore structure.

According to a further embodiment of the floatable foundation structure according to the application, at least one lifting device (e.g., a winch, a strand jack, a ratchet mechanism, etc.) may be at least temporarily arrangeable at at least one end (preferably at both ends) of the holding rope. In particular, the lifting device is configured to move the mass arrangement in a vertical direction, e.g. between a transport position and an installation position (and coupling position, respectively). For this purpose, the holding rope can be temporarily coupled to the lifting device.

In an installation method according to the application, it may be provided that in a pre-assembling step a coupling of the floating body arrangement with the mass arrangement is carried out by at least one holding rope, in particular by guiding a coupling section of the holding rope in an arcuate manner around a contact section of the mass arrangement (as has already been described). This can be done, for example, in a port. By means of the lifting device, the mass arrangement can be positioned in a transport position after the pre-assembling step or during the pre-assembling step. In this transport state, the foundation structure can be brought, in particular towed, to a specific installation location.

At the installation location, by means of the lifting device, the mass arrangement can be moved to an installation position. The installation position is in particular a lower position—seen in vertical direction—than the transport position. The at least one lifting device can be disassembled, for example, after reaching the installation position. In a simple manner, the transport of a foundation structure according to the application can be carried out. Also, a lifting device can be used during inspection work and/or maintenance work.

According to a further embodiment of the floatable foundation structure, two adjacent rope sections (and in particular rope sections (e.g., two leg sections) extending substantially parallel to each other at least in sections) may be coupled to each other via at least one rope bridge. The rope bridge can in particular ensure a defined position of the adjacent rope sections and preferably further reduce vibrations occurring at the coupled ropes.

A further aspect of the application is an offshore structure comprising at least one previously described floatable foundation structure. In particular, an offshore wind farm according to the application may have a plurality of these offshore structures, for example in the form of offshore wind turbines.

A still further aspect of the application is a method of manufacturing a floatable foundation structure, in particular a previously described floatable foundation structure. The method comprises:

providing at least one floatable mass arrangement, and
providing at least one mass arrangement,
wherein the method further comprises:
coupling the floating body arrangement to the mass arrangement by at least one holding rope by arcuately guiding a coupling section of the holding rope around a contact section of the mass arrangement.

The features of the foundation structures, offshore structures and methods may be freely combined with each other. In particular, features of the description and/or dependent claims may be independently inventive, even by completely or partially bypassing features of the independent claims, either alone or freely combined with each other.

BRIEF DESCRIPTION OF THE DRAWINGS

There are now a multitude of possibilities to design and further develop the foundation structure according to the application, the offshore structure according to the application and the method according to the application. In this regard, reference is made on the one hand to the patent claims subordinate to the independent patent claims, and on the other hand to the description of embodiments in connection with the drawing. In the drawings:

FIG. 2b shows a schematic partial view of the further embodiment according to FIG. 2a;

FIG. 2c shows a schematic partial view of the further embodiment according to FIG. 2a;

In the figures, the same reference signs are used for the same elements.

DETAILED DESCRIPTION OF THE INVENTION

Figure 1:
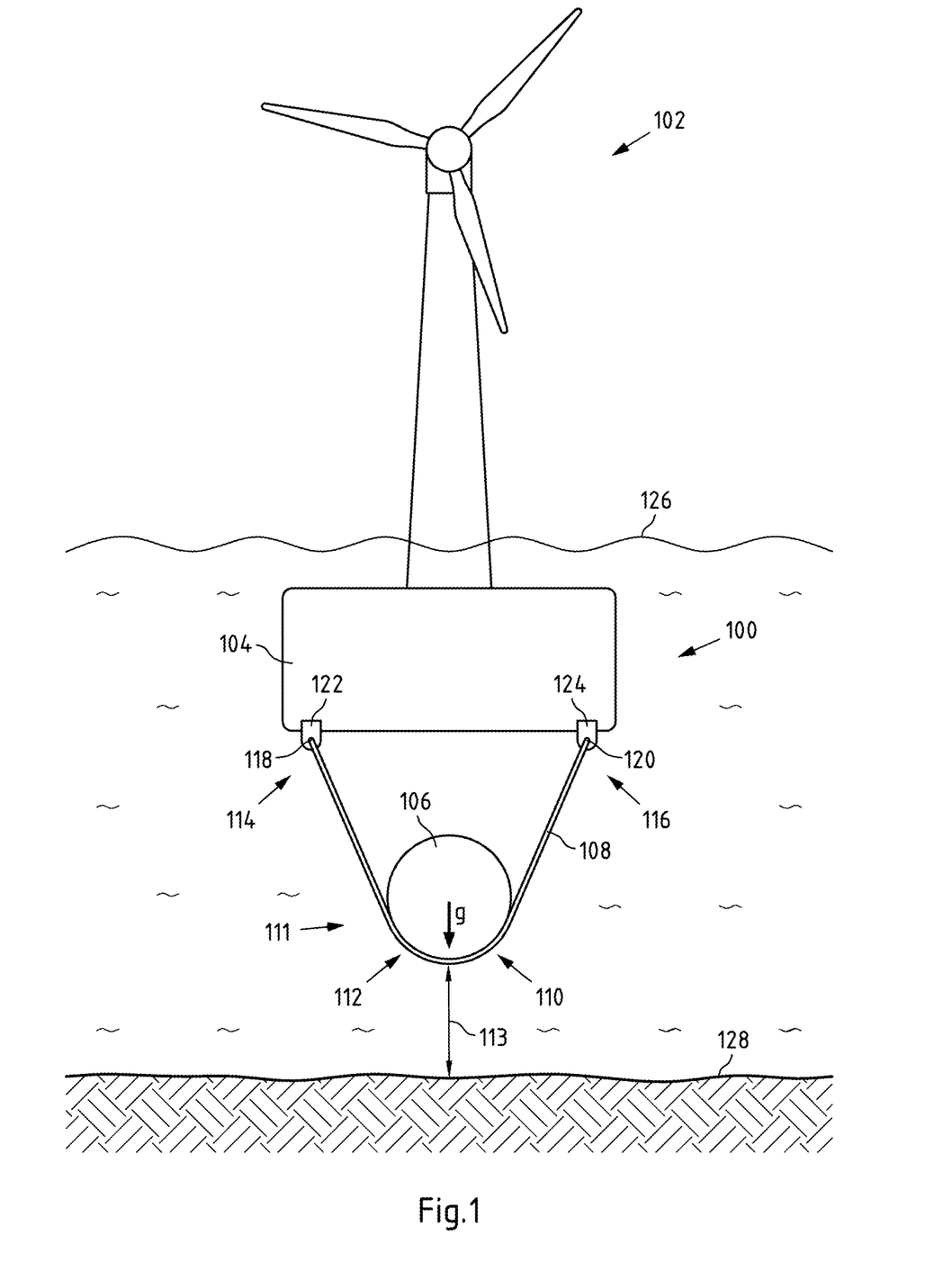
FIG. 1 shows a schematic view of an embodiment of a floatable foundation structure according to the present application.

FIG. 1 shows a schematic view of an embodiment of a floatable foundation structure 100 according to the present application for an offshore structure 102. Exemplarily, an offshore wind turbine 102 is shown as the offshore structure 102. It shall be understood that other offshore structures may be provided in other variants of the application.

The depicted floatable foundation structure 100 comprises a floating body arrangement 104 and a mass arrangement 106. The floating body arrangement 104 comprises at least one floating body and buoyancy body, respectively, that may be, for example, at least partially hollow in its interior and/or filled with a light solid material.

The mass arrangement 106 comprises at least one mass body that may be made of steel, cast iron, cast steel, concrete, a cementitious material, or a combination thereof. The weight force g acts on the mass body.

Mass arrangement 106 and floating body arrangement 104 can generally have any external shape. Preferably, tubular or cylindrical mass and/or floating bodies may be provided.

The foundation structure 100 is shown herein in a coupling state, in which the mass arrangement 106 is coupled to the floating body arrangement 104 using at least one holding rope 108. The at least one holding rope 108 and tether cable 108, respectively, may be made of metal (e.g., steel), polyethylene (preferably HDPE (high-density polyethylene)), or a synthetic fiber material.

In the coupling state, for coupling the floating body arrangement 104 to the mass arrangement 106, a coupling section 112 of the holding rope 108 is arcuately (v-shaped) guided around a contact section 110 of the mass arrangement 106. Between the coupling section 112 of the holding rope 108 and the contact section 110 of the mass arrangement 106, a secure connection and thus a secure coupling of the floating body arrangement 104 and the mass arrangement 106 is established due to the weight force g acting thereon. In particular, due to the weight force acting on the arcuate coupling section 112, the holding rope 108 is tensioned such that the structure takes a stable and durable state (without requiring one end of the holding rope to be directly connected to the mass arrangement).

In particular, as can be seen, the holding rope 108 encircles with substantially half a winding the contact section 110 of the mass arrangement 106. In other variants of the application, the holding rope may also have more than half a winding wrapped around and encircled, respectively, the contact section 110.

As can be seen, for example, a first end 118 of the holding rope 108 may be fixed to a first attachment point 122 (e.g., a welded eyelet) at the floating body arrangement 104. The first end 118 is part of a first end section 114, which is joined by the coupling section 112. At the coupling section 112, a second end section 116 is joined with the other end 120 of the holding rope 108 fixed to a second attachment point 124 (e.g., a welded eyelet) at the floating body arrangement 104.

Reference sign 126 denotes the water surface, and reference sign 128 denotes the water bottom surface (in particular a sea bottom surface). As can be seen, in the present embodiment, the mass arrangement 106 is suspended at/from the floating body arrangement 104 by the at least one holding rope 108 in a (permanent and in particular constant) coupling position 111, wherein the distance 113 between the coupling position 111 and the water bottom 128 is preferably at least 15 m, more preferably at least 50 m. In this case, the mass arrangement 106 may in particular perform the function of a pendulum to stabilize the position of the floating body arrangement 104 and the offshore structure 102, respectively.

In other variants, in the coupling state the mass arrangement may also be in contact with the bottom of the water, for example resting on it or being at least partially buried.

Figure 2A:
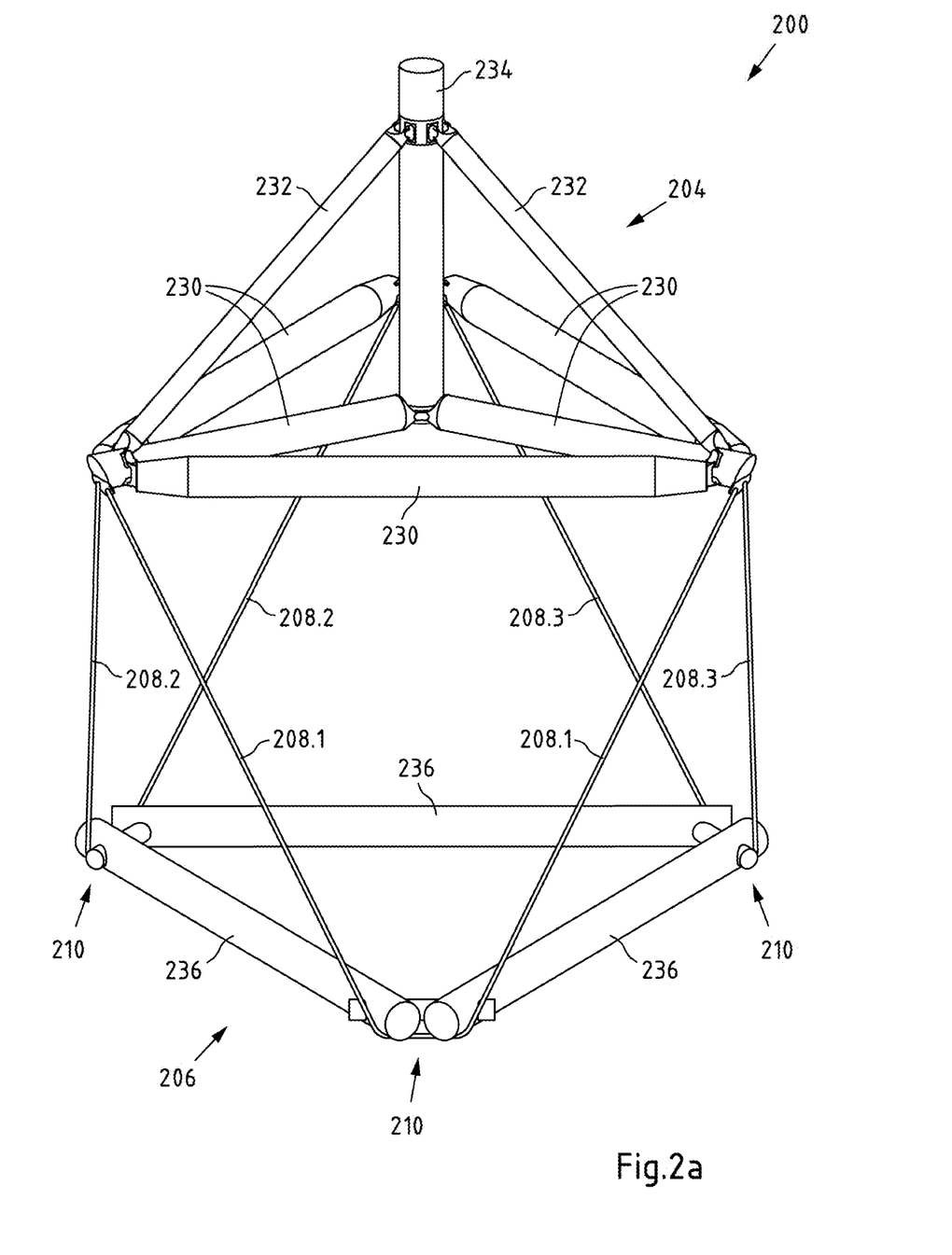
FIG. 2a shows a schematic view of a further embodiment of a floatable foundation structure according to the present application.

FIG. 2a shows a schematic view of a further embodiment of a floatable foundation structure 200 (shown without an offshore structure for clarity reasons) according to the present application. In order to avoid repetitions, essentially only the differences of the previous embodiment are described below and otherwise reference is made to the previous explanations.

In particular, the illustrated foundation structure 200 is based on the tetraspar concept. In the present embodiment, the floating body arrangement 204 comprises a plurality of (tubular) floating bodies 230 that may be interconnected. For example, three floating bodies 230 may form a triangular shape in a horizontal plane in an installation state (each leg of the triangle may be formed by a floating body 230). In addition, a vertically extending floating body 234 may be arranged at the center of the triangle, and a further floating body 230 may extend from each corner of the spanned triangle to the vertically arranged floating body 230. Further, struts 232 may be provided for stabilization.

A mass arrangement 206 is coupled, in particular suspended, to/from this floating body arrangement 204 in the present case. The mass arrangement 206, formed in particular as a mass stabilizer arrangement 206, may comprise a plurality of tubular mass bodies 236, which preferably form a triangular shape in a horizontal plane in an installation state (each leg of the triangle may be formed by a mass body 236). Through this, the mass stabilizer arrangement 206 can act as a pendulum that sufficiently (permanently) stabilizes the foundation structure 200 in an installed state.

A plurality of holding ropes 208.1, 208.2, 208.3 is used to couple the mass arrangement 206 and the floating body arrangement 204. In the previously described manner, in the coupling state, a coupling section 212 of the holding rope 208 is arcuately guided around a contact section 210 of the mass arrangement 206. In particular, a corner region of the triangle formed by the mass bodies 236 is wrapped as the contact section 210 of the mass arrangement 206 in the present case.

Figure 2B:
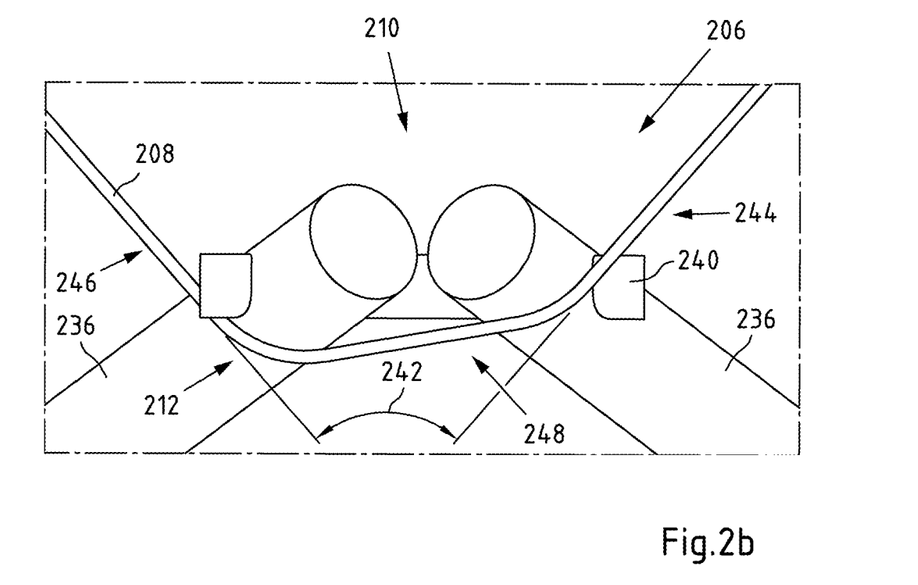
Figure 2C:
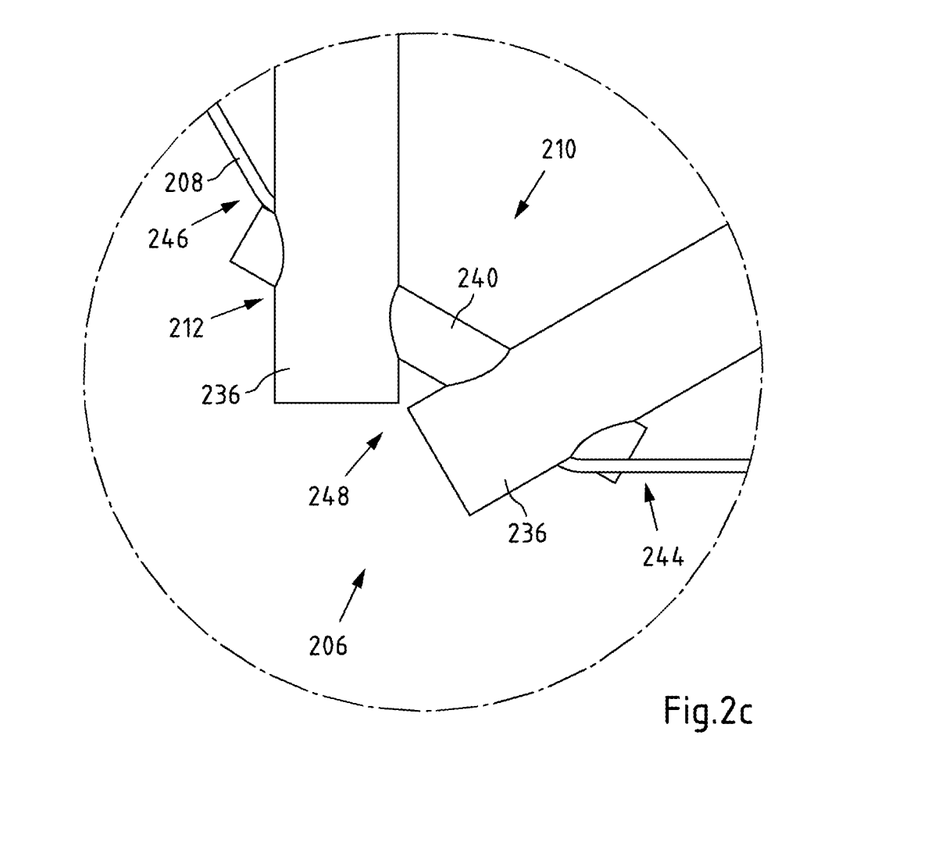

Enlarged sections of such a corner region are shown in FIGS. 2b and 2c as examples. At first, it can be seen that two mass bodies 236 are coupled to each other in the corner region by a connecting element 240, which in particular is passed through respective openings in the mass bodies 236. The respective outer ends of the connecting element 240 protrude from the openings. For example, a welding of the connecting element 240 to the mass bodies 236 (or another connection) may be provided.

As can be seen, in the coupling state, the coupling section 212 of the holding rope 208 is guided in an arcuate manner around the contact section 210 of the mass arrangement 206, such that the coupling section 212 of the holding rope 208 forms a loop retainer in which the contact section 210 of the mass arrangement 206 is held (securely, in particular due to the acting weight force). In particular, the holding rope 208 can be guided around and cooperate with the connecting element 240 in such a way that the ends of the connecting element 240 protruding from the openings further reduce the risk of slippage of the holding rope (cf. in particular FIG. 2c).

Further, the coupling section 212 of the holding rope 208 is formed by two leg subsections 244, 246 and a bend subsection 248, wherein the leg subsections 244, 246 are connected to each other by the bend subsection 248. The angle 242 between the leg subsections 244, 246 is at least less than 135°, preferably at least less than 90°, more preferably at least less than 15°.

Figure 3:
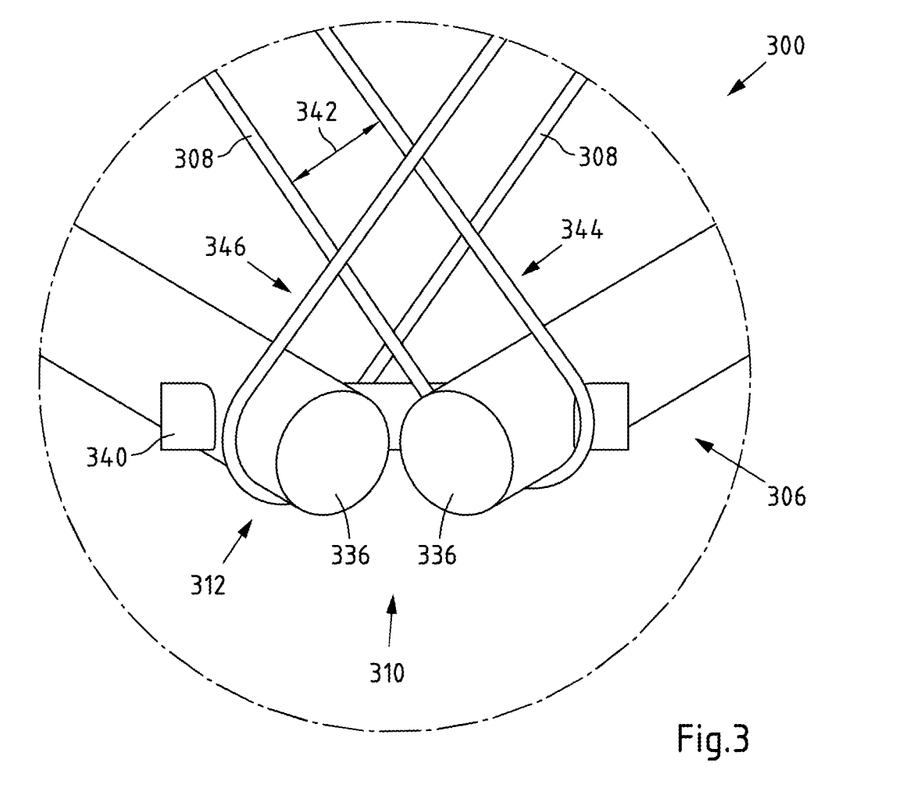
FIG. 3 shows a schematic view of a further embodiment of a floatable foundation structure according to the present application.

FIG. 3 shows a schematic view of a further embodiment of a floatable foundation structure 300 according to the present application. In particular, only a partial section is shown for a better overview. The mass arrangement 306 corresponds to the mass arrangement of FIG. 2. In the present case, a contact section 312 is formed by an end region of a mass body 336 (and not the entire corner region). In particular, each end region of a tubular mass body 336 is wrapped by a respective holding rope 308. Also in this embodiment, the holding rope 308 may be guided around and cooperate with the connecting element 340 in such a way that the ends of the connecting element 340 protruding from the openings further reduce the risk of slippage of the holding rope 308.

As can be further seen, the angle 342 may be substantially 0° such that the Respective leg subsections 344,346 are substantially parallel to each other.

Figure 4:
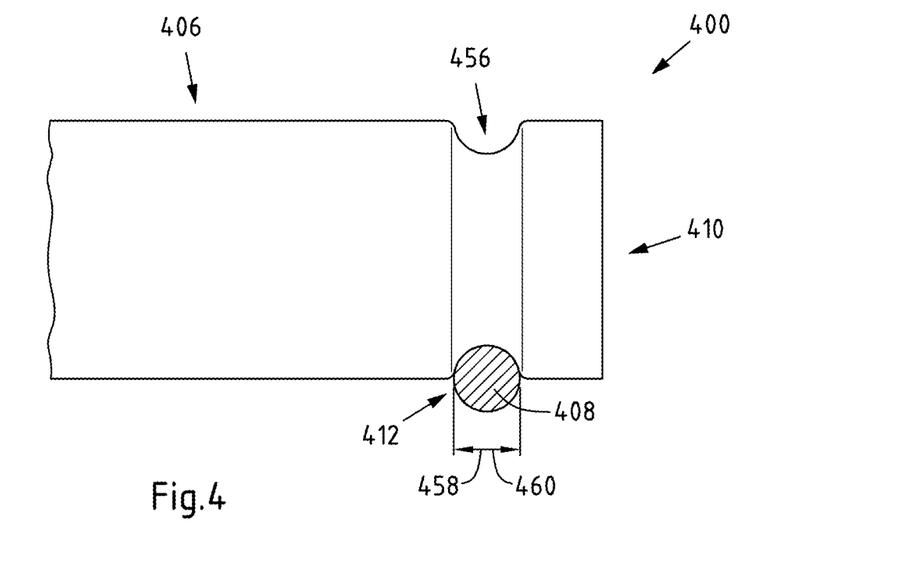
FIG. 4 shows a schematic partial view of a further embodiment of a floatable foundation structure according to the present application.

FIG. 4 shows a schematic (cross-sectional) partial view of a further embodiment of a floatable foundation structure 400 according to the present application. In order to avoid repetitions, substantially only the differences from the previous embodiments are described below, and otherwise reference is made to the previous embodiments.

In the present embodiment, the contact section 410 of the mass arrangement 406 comprises a recess 456 in the form of a groove 456. Here, the inner shape of the groove corresponds to the outer shape of the coupling section 412. In particular, the diameter 458 of the groove 456 may substantially correspond to the outer diameter 460 of the coupling section 412. For example, the groove may have a depth substantially equal to the radius of the holding rope 408. In a coupling condition, the coupling section 412 of the holding rope 408 may be disposed in the groove 456. This may further prevent slippage of the holding rope 408.

Figure 5:
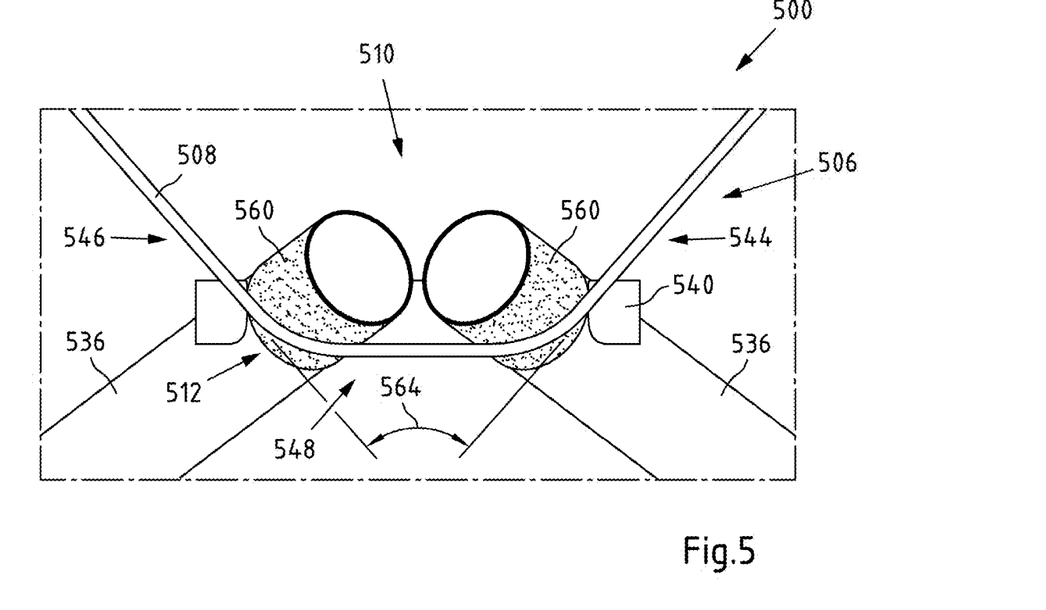
FIG. 5 shows a schematic partial view of a further embodiment of a floatable foundation structure according to the present application.

FIG. 5 shows a schematic partial view of a further embodiment of a floatable foundation structure 500 according to the present application. In order to avoid repetitions, essentially only the differences from the previous embodiments are described below, and otherwise reference is made to the previous embodiments.

In the illustrated example, at least one friction reduction element 560 is arranged at the contact section 510 of the mass arrangement 506. In particular, the friction reduction element 560 is a soft (for example, adhered) layer 560 made of an elastomeric material, such as neoprene rubber. The layer 560 is configured at least to reduce the coefficient of friction in the contact area between the contact section 510 of the mass arrangement 506 and the coupling section 512 of the holding rope 508 to at least less than 0.15, in particular less than 0.05. In other variants of the application, a friction reduction element may alternatively or additionally be arranged on or form the outer surface of the holding rope.

Figure 6:
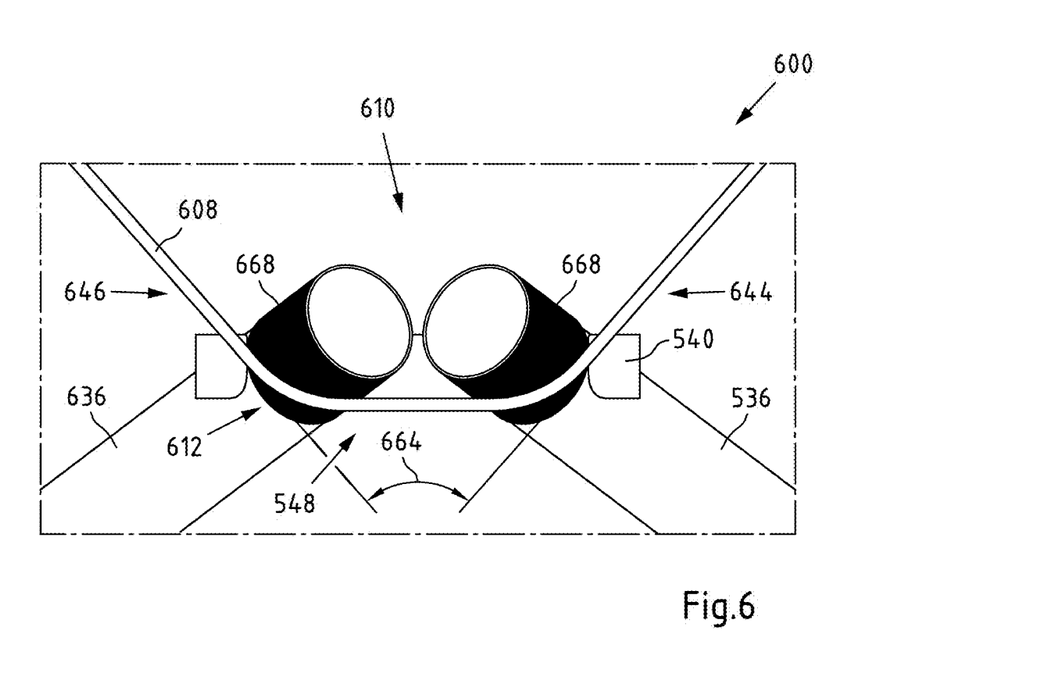
FIG. 6 shows a schematic partial view of a further embodiment of a floatable foundation structure according to the present application.

FIG. 6 shows a schematic partial view of a further embodiment of a floatable foundation structure 600 according to the present application. In order to avoid repetitions, essentially only the differences of the previous embodiments are described below, and otherwise reference is made to the previous embodiments.

Presently, at least one motion reduction element 668 is arranged at the contact section 610 of the mass arrangement 606, configured at least to reduce a relative movement between the coupling section 612 of the holding rope 608 and the contact section 610 of the mass arrangement 606. In particular, as a motion reduction element 668, presently an adhesive agent 668 in the form of an adhesive layer 668 is applied to the (potential) contact layer of the contact section 610.

In other variants of the application, an adhesive layer may alternatively or additionally be applied to the coupling section of the holding rope. Preferably, a two-component adhesive agent may be used as the motion reduction element, wherein one component may be applied to the coupling section and one component may be applied to the contact section. Only when the two components come into contact an adhesive effect can be generated.

In other variants of the application, alternatively or additionally at least one clamp element may be provided which can fix the coupling section to the contact section by a clamping action.

Figure 7:
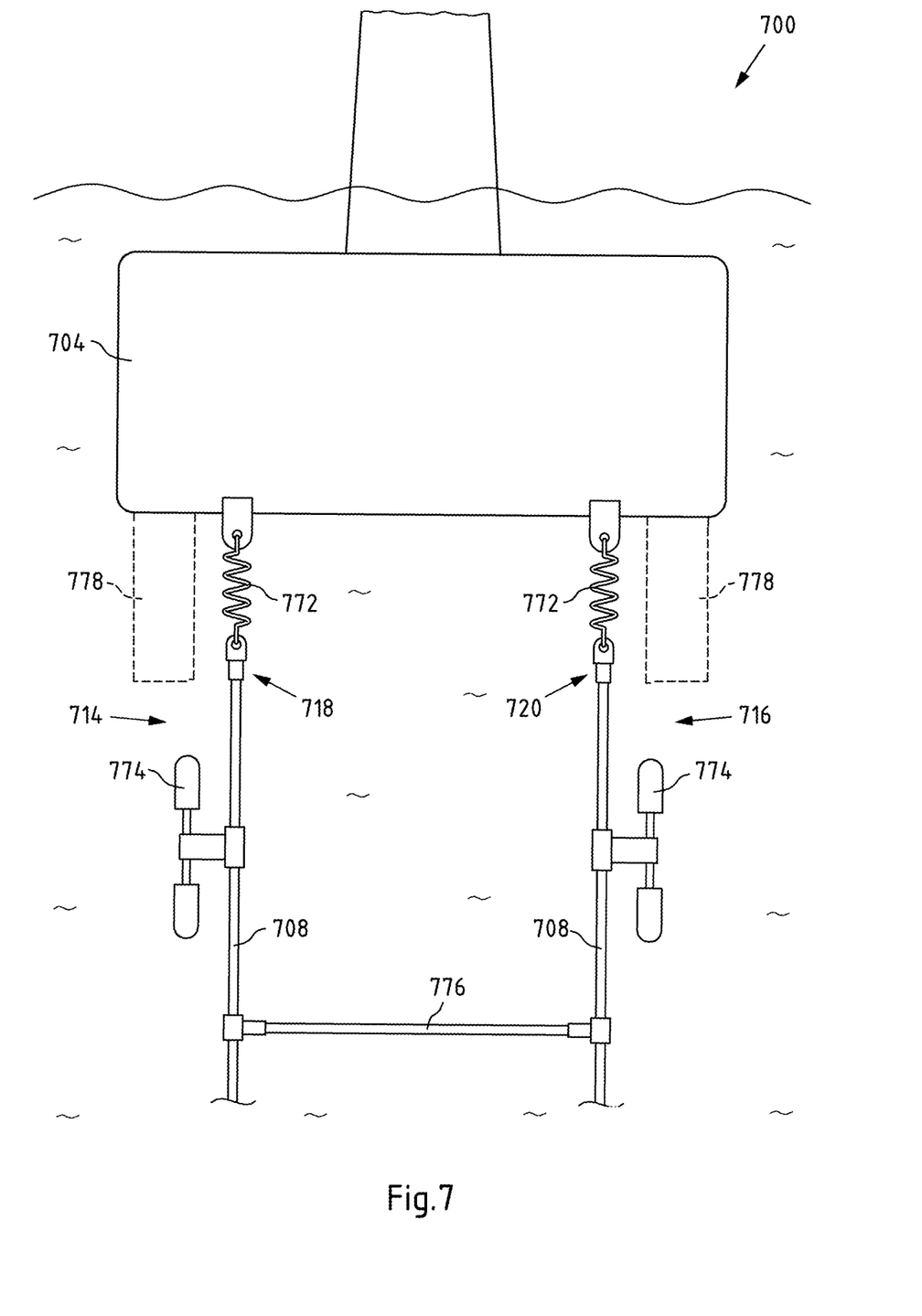
FIG. 7 shows a schematic partial view of a further embodiment of a floatable foundation structure according to the present application.

FIG. 7 shows a schematic partial view of a further embodiment of a floatable foundation structure 700 according to the present application. In order to avoid repetitions, essentially only the differences from the previous embodiments will be described below, and otherwise reference will be made to the previous embodiments.

In particular, in order to reduce the forces acting on a holding rope 708 and thus the risk of a damage of a holding rope 708, one or more of the elements described below may optionally be provided.

For example, a spring-loaded suspension mechanism 772 may be Arranged at at least one end 718,720 of the holding rope 708 (preferably, as shown, at Both ends 718,720 of the holding rope 708) for securing the holding rope 708 to the Floating body arrangement 704. In particular, the spring-loaded suspension mechanism 772 is configured to reduce peak dynamic forces in the holding rope 708 by at least 5%, preferably at least 15%, compared to a non-spring-loaded attachment of the holding Rope 708.

Alternatively or additionally, at least one mechanical vibration absorber 774 (preferably, a vibration absorber 774 may be arranged at each end section 714, 716 of the holding rope) may be provided. Presently, Stockbridge vibration absorbers 774 are attached to the holding rope 708.

Alternatively or additionally, a rope bridge 776 may be arranged between the adjacent rope sections 714, 716. In particular, the substantially parallel end sections 714, 716 of the holding rope 708 may be coupled by at least one (nearly rigidly formed) rope bridge 776.

At least temporarily (indicated by the dashed design), at least one lifting device 778 (e.g., a cable winch 778) may be arrangeable at at least one end 718, 720 (preferably at both ends 718, 720) of the holding rope 708. For example, a cable winch can be coupled to the holding rope 708 at least temporarily. In particular, the lifting device 778 is configured to move the mass arrangement (not shown here for the sake of a better overview) in a vertical direction, e.g. between a transport position and an installation position (and coupling position, respectively).

It shall be understood that the described embodiments according to FIGS. 1 to 7 can also be combined with each other.

Figure 8:
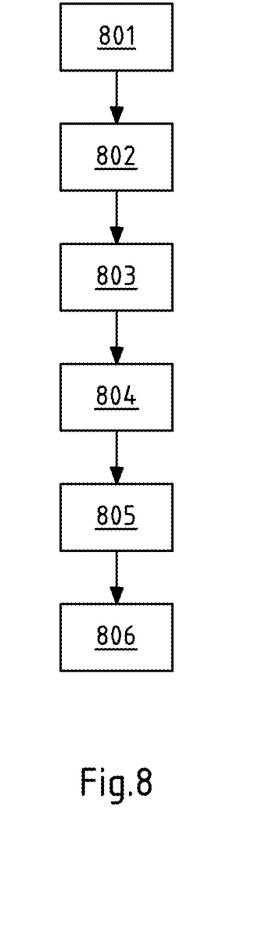
FIG. 8 shows a diagram of an embodiment of a method according to the present application.

FIG. 8 shows a diagram of an embodiment of a method according to the present application. In particular, a method for manufacturing a previously described floatable foundation structure according to one of the embodiments according to FIGS. 1 to 7 or a combination thereof is shown.

In a first step 801, a providing of at least one (previously described) floatable foundation structure is performed. In a step 802 (which may, for example, be performed in parallel with step 801), a providing of at least one (previously described) mass arrangement is performed.

In a step 803, a coupling of the floating body arrangement to the mass arrangement is performed by at least one holding rope by guiding a coupling section of the holding rope arcuately around a contact section of the mass arrangement. In other words, at least one holding rope is looped around a section of the mass arrangement so that a (secure and in particular permanent) coupling between the floating body arrangement and the mass arrangement is established by the weight force acting on the mass arrangement.

For example, a holding rope may be initially guided in a first vertical direction from a first end attached to a floating body. The coupling section may then be guided around the contact section in an arcuate manner, for example, in a semi-circular manner (as described, multiple turns may be provided). Then, the holding rope may be guided in the opposite vertical direction and the other end of the holding rope may be fixed to the floating body, for example. It shall be understood that guiding the holding rope in a vertical direction may comprise a horizontal component, for example, to establish an angle between the leg subsections of the holding rope between 0° and 135°.

Optionally, the steps 804 to 806 may follow the steps 801 to 803. These steps 804 to 806 may also form an independent method. In particular, in the steps 804 to 806 an installation method of a floatable foundation structure according to the application may be depicted.

In a pre-assembling step 804 (which may be at least partially identical to step 803), a coupling of the floatable foundation structure to the mass arrangement is performed by at least one holding rope, in particular by guiding a coupling section of the holding rope in an arc around a contact section of the mass arrangement. This can be done, for example, in a port. By means of the at least one lifting device, the mass arrangement can be positioned in a transport position in the step 804.

In this transport state of the foundation structure, the foundation structure can be brought, in particular towed by a ship, to a specific installation location, in a step 805.

At the installation location, by the lifting device, the mass structure can be moved to an installation position (step 806). The installation position (also called coupling position) is in particular a lower position—seen in vertical direction—than the transport position. The at least one lifting device can be disassembled, for example, after reaching the installation position.

Figure 9:
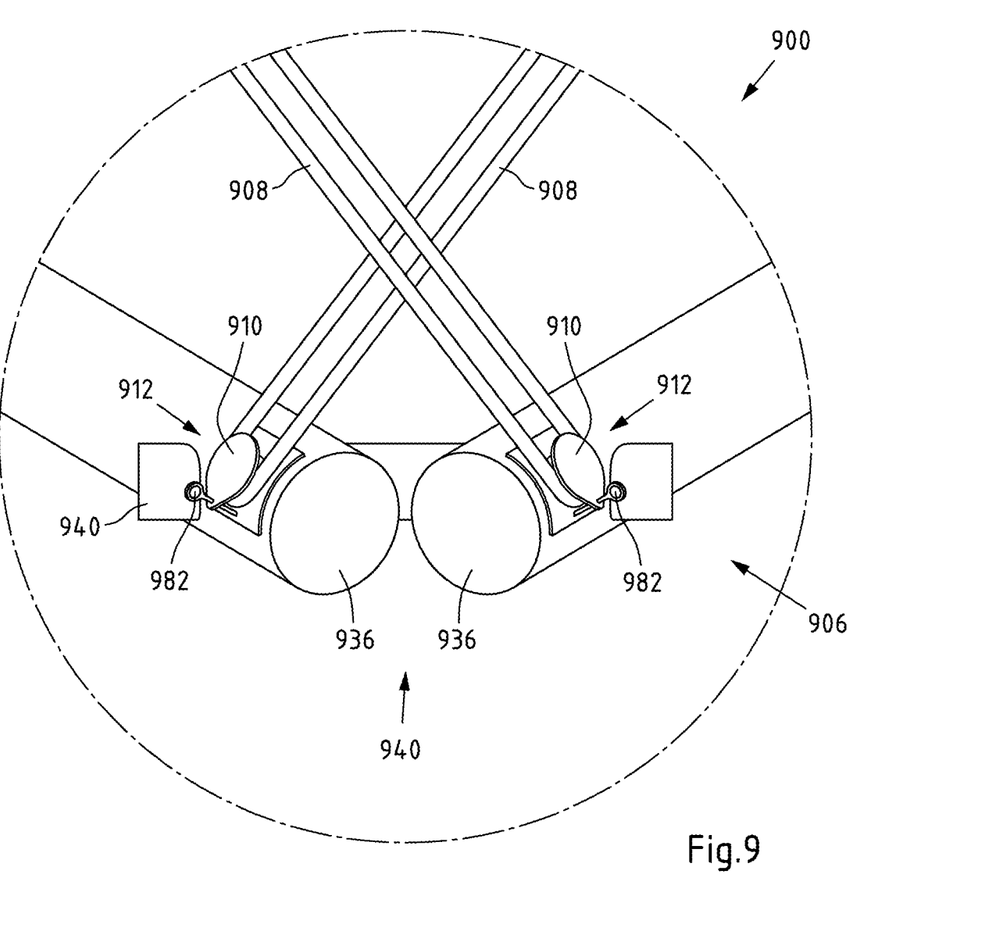
FIG. 9 shows a schematic view of a further (particularly preferred) embodiment of a floatable foundation structure according to the present application.

FIG. 9 shows a schematic view of a further (particularly preferred) embodiment of a floatable foundation structure 900 according to the present application. In particular, a corner region of a mass arrangement 906 is shown.

As can be seen, at least one contact section 910 is frictionally connected (e.g., welded, screwed, bonded, cast) to the mass arrangement 906 (in particular the outer side).

In particular, a contact section 910 of the mass arrangement 906 is presently formed by a turning pin 910 (or the like) fixed to the mass arrangement 906. A turning pin 910 is configured to reduce a movement of the holding rope 908. A turning pin 910 may have a circumferential collar at its end. The contact section 912 may extend and be guided, respectively, between the outer wall of the mass arrangement 906 and the circumferential collar (arcuate). In particular, the distance between the collar and the outer wall may be (slightly) smaller than the outer diameter of the inserted holding rope 908 (in particular of the contact section 912). In particular, the turning pin 910 can be adapted to the holding rope in such a way that a clamping of the contact section 912 of the holding rope 908 between the outer wall of the mass arrangement 906 and the circumferential collar is established in an installation state. A splint pin 982 may be arranged as an additional motion reduction element.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A floatable foundation structure for an offshore structure, comprising:
   at least one floating body arrangement; and
   at least one mass arrangement,
   wherein the mass arrangement is couplable to the floating body arrangement by at least one holding rope in a coupling state,
   wherein in the coupling state for coupling the floating body arrangement to the mass arrangement, a coupling section of the holding rope is arcuately guided around a wherein ends of the holding rope are each fixed to the floating body arrangement at a respective attachment point,
   wherein in the coupling state, the coupling section of the holding rope is arcuately guided around the contact section of the mass arrangement such that the coupling section of the holding rope forms a loop retainer in which the contact section of the mass arrangement is retained.

2. The floatable foundation structure of claim 1, wherein in the coupling state, the coupling section of the holding rope is formed by at least two leg subsections and at least one bend subsection, wherein the two leg subsections are interconnected by the bend subsection, and an angle between the leg subsections is at least smaller than 135°, preferably at least smaller than 90°, in particular preferably at least smaller than 15°.

3. The floatable foundation structure of claim 1, wherein a radius of the contact section of the mass arrangement is at least twice larger than a rope diameter.

4. The floatable foundation structure of claim 1,
   wherein in the coupling state, the mass arrangement is suspended from the floating body arrangement by the at least one holding rope in a coupling position,
   wherein the distance between the coupling position and a bottom of the water body is preferably at least 15 m.

5. The floatable foundation structure of claim 1, wherein in the coupling state, the mass arrangement is in contact with a water bottom.

6. The floatable foundation structure of claim 1,
   wherein at least one movement reduction element is arranged at the coupling section of the holding rope and/or the contact section of the mass arrangement,
   wherein the motion reduction member is configured at least to reduce a relative motion between the coupling section of the holding rope and the contact section of the mass arrangement in the coupling state.

7. The floatable foundation structure of claim 6, wherein the at least one motion reduction element is selected from a group comprising:
   clamp element,
   a friction member configured to increase friction in a contact region between the coupling section of the holding rope and the contact section of the mass arrangement,
   adhesive agent, and
   grouting agent.

8. The floatable foundation structure of claim 1,
   wherein at least one friction reduction element is arranged at the coupling section of the holding rope and/or the contact section of the mass arrangement,
   wherein the friction reduction element is configured at least to reduce the coefficient of friction in a contact region between the coupling section of the holding rope and the contact section of the mass arrangement to at least less than 0.15, in particular less than 0.05.

9. The floatable foundation structure of claim 8, wherein the at least one friction reduction element is at least one greasy and/or oiled contact surface of the coupling section of the holding rope and/or the contact section of the mass arrangement,
   and/or
   the at least one friction reduction element is a soft surface layer of the coupling section of the holding rope and/or the contact section of the mass arrangement,
   wherein the soft surface layer is made of an elastomeric material.

10. The floatable foundation structure of claim 1,
    wherein the contact section of the mass arrangement comprises a recess,
    wherein an inner shape of the recess corresponds to an outer shape of the coupling section of the holding rope.

11. The floatable foundation structure of claim 1, wherein the contact section of the mass arrangement is formed by a turning pin fixed to the mass arrangement.

12. The floatable foundation structure of claim 1, wherein a spring-loaded suspension mechanism is arranged at at least one end of the holding rope.

13. The floatable foundation structure of claim 1, wherein at least one lifting mechanism is at least temporarily arrangeable at at least one end of the holding rope.

14. The floatable foundation structure of claim 1, wherein at least one mechanical vibration absorber is arranged on the holding rope.

15. The floatable foundation structure of claim 14, wherein the at least one mechanical vibration absorber is a Stockbridge vibration absorber.

16. The floatable foundation structure of claim 1, wherein two adjacent rope sections of at least one holding rope are coupled together via at least one rope bridge.

17. An offshore structure comprising at least one floatable foundation structure of claim 1.

18. A method of manufacturing a floatable foundation structure, in particular a floatable foundation structure of claim 1, comprising:
providing at least one floating body arrangement; and
providing at least one mass arrangement,
wherein the method further comprises:
coupling the floating body arrangement to the mass arrangement by at least one holding rope by providing a coupling section of the holding rope being arcuately guided around a contact section of the mass arrangement in such a way that the coupling section of the holding rope forms a loop retainer in which the contact section of the mass arrangement is retained.

19. The floatable foundation structure of claim 1, wherein a radius of the contact section of the mass arrangement is at least five times larger than a rope diameter.

20. The floatable foundation structure of claim 1, wherein the radius of the contact section of the mass arrangement is at least at least fifteen times larger than a rope diameter.

21. The floatable foundation structure of claim 1, wherein in the coupling state, the mass arrangement is suspended from the floating body arrangement by the at least one holding rope in a coupling position,
wherein the distance between the coupling position and a bottom of the water body is at least 50 m.

22. A floatable foundation structure for an offshore structure, comprising:
at least one floating body arrangement; and
at least one mass arrangement,
wherein the mass arrangement is couplable to the floating body arrangement by at least one holding rope in a coupling state,
wherein in the coupling state for coupling the floating body arrangement to the mass arrangement, a coupling section of the holding rope is arcuately guided around a contact section of the mass arrangement,
wherein in the coupling state, the coupling section of the holding rope is arcuately guided around the contact section of the mass arrangement such that the coupling section of the holding rope forms a loop retainer in which the contact section of the mass arrangement is retained;
wherein ends of the holding rope are each fixed to the floating body arrangement at a respective attachment point,
wherein, in the coupling state, the respective attachment point is higher in a vertical direction than the contact section of the mass arrangement.

* * * * *

UNITED STATES PATENT AND TRADEMARK OFFICE
CERTIFICATE OF CORRECTION

| | |
|---|---|
| PATENT NO. | : 11,807,343 B2 |
| APPLICATION NO. | : 17/951863 |
| DATED | : November 7, 2023 |
| INVENTOR(S) | : Daniel Bartminn et al. |

It is certified that error appears in the above-identified patent and that said Letters Patent is hereby corrected as shown below:

On the Title Page

The city of Inventor/Applicant, Henrik Stiesdal, is listed as:
"Odense"

Should be listed as:
--Odense C--

In the Claims

Claim 1, Line 11 reads:
"a wherein ends of the holding rope are each fixed to the"

Should read:
--a contact section of the mass arrangement, wherein ends of the holding rope are each fixed to the--

Signed and Sealed this
Twenty-sixth Day of December, 2023

Katherine Kelly Vidal
*Director of the United States Patent and Trademark Office*